United States Patent Office 2,923,696
Patented Feb. 2, 1960

2,923,696

RESINOUS COMPOSITIONS AND METHOD FOR PRODUCING SAME

Kenneth E. Harwell and William J. Peppel, Austin, Tex., assignors to Jefferson Chemical Company, Inc., Houston, Tex., a corporation of Delaware No Drawing. Application December 6, 1957
Serial No. 700,940

8 Claims. (Cl. 260—47)

This invention relates to resinous compositions and to a method for producing same. More particularly, the invention relates to infusible epoxy resin compositions formed by the reaction of an epoxy resin with a high boiling amine product.

Epoxy resins are known to set up or harden when intimately admixed with certain materials known as hardeners or curing agents. An important class of such hardeners are the organic amine compounds including such widely employed materials as ethylenediamine and the like. In contrast to the known methods, the present invention provides a method for curing epoxy resins employing novel high-boiling amine products. Surprisingly, the resinous products obtained exhibit superior physical properties, such as improved hardness, high tensile strength, good impact strength, and greater elasticity while at the same time providing economical curing materials. Another practical advantage of the process is the reduced toxicity due to the high boiling point of the amines.

Epoxy surface coatings cured with these amines have shown superior gloss, gloss retention, and improved weather resistance, especially on wood surfaces. These surface coatings have extremely high impact resistance and great flexibility. The surface coatings also show the chemical resistance characteristic of epoxy resins with markedly improved resistance to alkaline solutions.

In accordance with this invention, an epoxy resin is admixed with a minor amount of a high-boiling amine product, the preparation of which is described in detail hereinbelow. On contact, the resin and the high boiling amine react autogenously, generally with the production of considerable heat. On completion of this reaction, there is produced an infusible resinous product having the advantages noted above.

The amines employed in this process are high-boiling components of a complex amine reaction product obtained from the reaction of a material selected from the class consisting of monoethanolamine and ethylene glycol with ammonia. The desired high-boiling amine product is obtained by removing certain fractions of the complex reaction product.

Production of the complex amine reaction product from which the high-boiling amine components are obtained is accomplished by reacting monoethanolamine or ethylene glycol with ammonia at an elevated temperature and a superatmospheric pressure in the presence of hydrogen and a hydrogenation catalyst. This reaction may be conducted at a temperature from about 150–400° C., preferably in the range of 200 and 275° C. The pressure may range from about 30 up to about 400 atmospheres.

The molar amount of ammonia employed in this reaction should be in excess over the molar amount of monoethanolamine or ethylene glycol employed. Normally there will be in the order of about 2 or 3 mols of ammonia per mol of the companion reactant. Hydrogen is essential for this reaction and should amount to a substantial part of the reaction atmosphere. As a rule, there should be at least 10 and preferably between 20 and 200 atmospheres of hydrogen pressure employed.

The reaction is conducted in the presence of a hydrogenation catalyst. While a larger number of hydrogenation catalysts may be employed, the preferred catalyst comprises one or more of the materials selected from the group consisting of copper, nickel, cobalt and their oxides. Despite the suitability of the oxides, however, it is preferred practice to employ the catalyst in a reduced form. The preferred catalyst may also be employed with a normally non-reducible metal oxide from the group consisting of chromium oxide, manganese oxide, molybdenum oxide and thorium oxide. A specific preferred catalyst composition consists of 75% nickel oxide, 22% copper oxide and 3% chromium oxide.

The crude complex reaction product obtained from the above reaction is subjected to distillation at temperatures up to about 200° C. under atmospheric pressure. This step effectively removes certain low-boiling materials leaving, as the desired primary product, a high-boiling amine product which may amount to about 50% by weight of the crude complex reaction product. This high boiling product, which is a dark, viscous, oily liquid having a hydroxyl number of 5.8, an amine equivalence of 47 grams/mol (by epoxide reaction) and a molecular weight according to Rast of about 125, is designated for further purposes below as hardener A.

The high-boiling amine product, termed hardener A, may be subjected to further treatment to obtain a more refined product exhibiting additional advantages as a curing agent. For example, the high-boiling amine product may be subjected to distillation to produce a 50%–90% overhead distillate therefrom, although a 60%–80% overhead distillate is preferred. One such product produced by distillation at reduced pressure, i.e., distillation from about 73° to 135° C. under 10 mm. (millimeters) of mercury absolute, is obtained as a 60% overhead distillate and is a refined, light colored curing agent. This refined product obtained overhead has a boiling range of about 200–300° C. at atmospheric pressure, a hydroxyl number of about 6.7, an amine equivalence of 43 grams/mol (by epoxide reaction), a molecular weight (Rast) of about 126, a Gardner color of 9, and has an average of 2.9 reactive groups per molecule. This product is hereafter designated hardener B.

Overhead distillates amounting to about 80% of hardener A have also been obtained. These distillates have been designated hardener C, and are preferred for use in surface coatings. The properties of hardener C are similar to those of hardener B with the exception that there is an improvement in gloss and smoothness of finish of surface coatings and there is less deterioration if subjected to elevated temperatures or baking.

Only a minor amount of the hardener is necessary to effect curing of the epoxy resin. Ordinarily the proportion of hardener employed is in the range of 5 to 30 parts by weight per 100 parts of epoxy resin.

The ether resins employed in the compositions of this invention are characterized by the presence therein of a plurality of ether groups and by an epoxy equivalency greater than one. The epoxy equivalency refers to the number of 1,2-epoxy groups

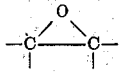

contained in the average molecule of the ether resin.

The ether resins of the type employed may be prepared by the reaction of epichlorohydrin with phenols and alcohols in an alkaline medium. One of the simplest of the phenolic resins is the diglycidyl diether of a dihydric phenol. More often, the ether resin will be of complex character containing two or more aromatic hydrocarbon radicals and glycidyl radicals linked together by ethereal oxygen atoms. In a typical preparation, epichlorohydrin is reacted with a polyhydric phenol, such as diphenylol propane, resorcinol phloroglucinol, at a temperature from about 50–150° C. in the presence of a base or alkaline agent. The base, which may be sodium or potassium hydroxide, is employed in a slight stoichiometrical excess to the epichlorohydrin. The product is a complex mixture of glycidyl polyethers and may be represented by the formula:

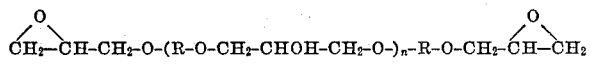

in which $n$ is an integer of the series 0, 1, 2, 3 . . . and R represents a divalent hydrocarbon radical selected from the group consisting of polyhydric phenols and polyhydric alcohols.

Any of the various dihydric phenols may be used in preparing the polyethers including mononuclear phenols such as resorcinol, catechol, hydroquinone, methylresorcinol, etc.; or polynuclear phenols like 2,2-bis(4-hydroxyphenyl)propane which is termed bisphenol-A herein for convenience, 4,4'-dihydroxybenzophenone, bis(4-hydroxyphenyl)methane, 1,1-bis(4-hydroxyphenyl)ethane, 1,1-bis(4-hydroxyphenyl)-isobutane, 2,2-bis(4-hydroxyphenyl)butane, 2,2-bis(4-hydroxy-2-methylphenyl)propane, 2,2 - bis(4 - hydroxy - 2 - tertiarybutylphenyl) propane, 2,2-bis(2-hydroxynaphthyl)pentane, 1,5-dihydroxynaphthalene, etc.

Preferred polyethers are prepared from 2,2-bis(4-hydroxyphenyl) propane. They contain a chain of alternating glyceryl and 2,2-bis(4-phenylene) propane radicals separated by intervening ethereal oxygen atoms and have a 1,2-epoxy equivalency between 1.0 and 2.0, a molecular weight of about 340 to 624 and an epoxide equivalent weight of about 175 to 400.

Also suitable for use in the invention are glycidyl polyethers of polyhydric alcohols. Because they contain a plurality of glycidyl groups such substances are capable of curing in the same manner as that of the glycidyl polyethers of polyhydric phenols. Among representative compounds of this class are diglycidyl ethers of ethylene glycol, propylene glycol, trimethylene glycol, butylene glycol, diethylene glycol, triethylene glycol, tripropylene glycol, and the like, as well as ethers containing more than two glycidyl groups such as the glycidyl polyethers of glycerol, diglycerol, erythritol, pentaglycerol, pentaerythritol, mannitol, sorbitol, polyallyl alcohol, polyvinyl alcohol, and the like. Such glycidyl polyethers also have a 1,2-epoxy value greater than 1.0.

The ether resin employed in the following examples to illustrate applicants' curing agents were prepared by reacting epichlorohydrin with 2,2-bis(4-hydroxyphenyl) propane (bisphenol-A) in the presence of an alkaline agent. This epoxy resin, which has an epoxy gram equivalent weight of 195, may be represented by a formula such as:

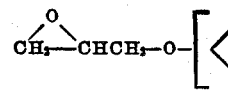 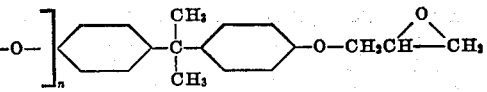

where $n$ has the values noted above. The proportions shown are in parts by weight.

Example I

One hundred parts of an ether resin prepared from epichlorohydrin and bisphenol-A having an epoxide equivalent weight of 195 were thoroughly admixed with 14 parts by weight of hardener A described hereinabove. The mixture heated rapidly and in about 1 hour had hardened to an infusible solid. After aging for one day, the Barcol hardness of this composition was found to be 33. On further aging the Barcol hardness of this sample increased.

In contrast, a resin prepared in the same manner except that 16 parts of diethylene triamine were employed as the hardening agent tested to a Barcol hardness of 8 after aging for one day. Varying the quantities of diethylene triamine employed did not produce a significant improvement in the Barcol hardness of the additional samples. The resin cured with hardener A showed a higher softening temperature by the hot point method of Dannenburg and Harp, Anal. Chem. 28, 86 (1956).

Example II

One hundred parts of the ether resin, described in Example I were admixed with 14 parts of hardener B. The materials reacted quickly as evidenced by a sharp rise in the autogenous temperature. The reaction formed an infusible solid in about one hour. On test for hardness after one day of aging, the sample indicated a Barcol hardness of 29. The hardness value of the cured resin increased substantially after additional aging.

In contrast, cured resins prepared with 20 parts of diethylenetriamine, and 7 parts of ethylene diamine to 100 parts of the epoxy resin exhibited Barcol hardness values of 10 and 17, respectively. Resin cured with hardener B also gave a higher softening temperature by the hot point method referred to above.

Example III 20 parts of hardener A were admixed with 100 parts of the ether resin described in Example I. The composition cured to a solid in about one hour and exhibited a Barcol hardness value of 32 after aging for one day.

Example IV 30 parts of hardener A were admixed with 100 parts of the ether resin described in Example I. In these proportions, the reaction mixture exhibited a rapid reaction rate and reached a maximum autogenous temperature for these materials. The composition set up in about thirty minutes. The Barcol hardness was determined after a day's aging and was found to be 25.

The compositions of this invention may also be employed in coating formulations including those adapted to produce a clear finish and pigmented coatings. The surface coatings produced exhibit superior physical properties including excellent solvent resistance and high Sward hardness values. The following example illustrates the use of the compositions of the invention in a coating application. All parts are by weight.

Example V

The non-volatile component for this coating composition was an epoxy resin prepared from the reaction of epichlorohydrin with bisphenol-A. The resin was a solid material having a melting point about 70° C. and an epoxy equivalent weight in the order of 500. The solvent employed consisted of 33% methylisobutyl ketone, 33% "Cellosolve" and 34% xylene.

97 grams of the epoxy resin were dissolved in 42 grams of solvent. 1.8 grams of a commercial leveling agent, Beetle resin, were separately dissolved in 1.2 grams of the solvent. These solutions were then combined with the addition of another 25 grams of solvent; the entire mixture being denoted as the vehicle. A curing agent, hardener B, was then added to the vehicle in the proportion of 8.6 grams of curing agent per 100 grams of epoxy resin. Before admixture with the vehicle, however, the curing agent was dissolved in additional solvent to make a 50% by weight solution. The mixed composition was applied to 20 gauge steel panels and tested for various properties. This finish cured in 12 hours, was unaffected after 2 hours in boiling water, was unbroken by a ⅛" diameter bend, withstood a Gardner-reverse impact of more than 100 inch-pounds, and had a Sward hardness of 41.

The surface coating exhibited excellent resistance to caustic soda, water, acetone and toluene.

*Example VI*

A coating composition similar to that of Example V was prepared except that the curing agent employed was hardener C employed in the proportion of 8.6 grams of curing agent per 100 grams of epoxy resin. This finish had a Gardner color of 4.5 and a Gardner viscosity of N.

Tests of this coating composition after application and drying on 20 gauge steel panels gave the following data: curing time 11½ hours, thickness 0.0015", undamaged by ⅛" diameter bend, passed reverse impact of greater than 160-inch pounds, Sward hardness 56, unaffected by 2 hours in boiling water.

It has been determined that the lower boiling half of the high-boiling amine product may be separated into certain specific amines. Thus, distillation of the high-boiling amine product under reduced pressure produced the following:

| Material | Percent of amines boiling above monoethanolamine | B.P. at 760 mm., °C. |
|---|---|---|
| Diethylenetriamine | 4.3 | 207 |
| 1-(2-aminoethyl)piperazine | 12.8 | 218-221 |
| 1-piperazineethanol and 2-(2-aminoethylamino)ethanol | 39.5 | 240-244 |

Obviously many modifications and variations of the invention, as hereinbefore set forth, may be made without departing from the spirit and scope thereof, and therefore only such limitations should be imposed as are indicated in the appended claims.

We claim:

1. A method for preparing an infusible resin which comprises intimately admixing a glycidyl polyether of a hydroxy compound selected from the group consisting of polyhydric phenols and polyhydric alcohols, said glycidyl polyether having an epoxy equivalency greater than one with a high-boiling amine product in the proportion of 5-30 parts of said amine to 100 parts of said glycidyl polyether by weight, said amine product being obtained by reacting a material selected from the group consisting of monoethanolamine and ethylene glycol with ammonia the mols of said ammonia being in excess of the mols of said material selected from the group consisting of monoethanolamine and ethylene glycol up to a mol ratio of about 3:1, at a temperature from about 150° C. to 400° C. and a superatmospheric pressure in the presence of hydrogen and a hydrogenation catalyst thereby producing a complex reaction product and subjecting said reaction product to distillation at a temperature up to about 200° C. at atmospheric pressure to remove lower-boiling components thereby leaving a high-boiling amine product.

2. A process according to claim 1 in which said glycidyl polyether is represented by the formula:

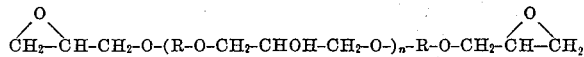

in which n is an integer of the series 0, 1, 2, 3 . . . and R represents a divalent hydrocarbon radical derived from a polyhydric compound selected from the group consisting of polyhydric phenols and polyhydric alcohols by the removal of the hydroxyl groups.

3. An infusible resinous composition produced by admixing a glycidyl polyether of a hydroxy compound selected from the group consisting of polyhydric phenols and polyhydric alcohols, said glycidyl polyether having an epoxy equivalency greater than one with a high-boiling amine product in the proportion of 5-30 parts of said amine to 100 parts of said glycidyl polyether by weight, said amine product being obtained by reacting a material selected from the group consisting of monoethanolamine and ethylene glycol with ammonia the mols of said ammonia being in excess of the mols of said material selected from the group consisting of monoethanolamine and ethylene glycol up to a mol ratio of about 3:1, at a temperature from about 150° C. to 400° C. and a superatmospheric pressure in the presence of hydrogen and a hydrogenation catalyst thereby producing a complex reaction product and subjecting said reaction product to distillation at a temperature up to about 200° C. at atmospheric pressure to remove lower-boiling components thereby leaving a high-boiling amine product.

4. A method for preparing an infusible resin which comprises intimately admixing a glycidyl polyether represented by the formula:

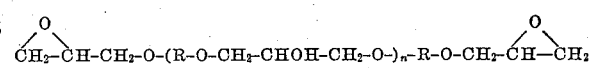

in which n is an integer of the series 0, 1, 2, 3 . . . and R represents a divalent hydrocarbon radical derived from a polyhydric compound selected from the group consisting of polyhydric phenols and polyhydric alcohols by the removal of the hydroxyl groups, with an amine fraction having a Gardner color less than 10 in the proportion of 5-30 parts of said amine fraction to 100 parts of said glycidyl polyether by weight, said amine fraction being obtained by reacting a material selected from the group consisting of monoethanolamine and ethylene glycol with ammonia the mols of said ammonia being in excess of the mols of said material selected from the group consisting of monoethanolamine and ethylene glycol up to a mol ratio of about 3:1, at a temperature from about 150° C. to 400° C. and a superatmospheric pressure in the presence of hydrogen and a hydrogenation catalyst thereby producing a complex reaction product, subjecting said complex reaction product to distillation at a temperature up to about 200° C. at atmospheric pressure to remove lower-boiling components thereby leaving a high-boiling amine product, and subjecting said high-boiling amine product to distillation at a temperature up to about 135° C. at 10 mm. of pressure absolute to recover overhead an amine fraction having a Gardner color less than 10.

5. An infusible resinous composition produced by admixing a glycidyl polyether represented by the formula:

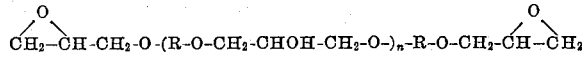

in which n is an integer of the series 0, 1, 2, 3 . . . and R represents a divalent hydrocarbon radical derived from a polyhydric compound selected from the group consisting of polyhydric phenols and polyhydric alcohols by the removal of the hydroxyl groups, with an amine fraction having a Gardner color less than 10 in the proportion of 5-30 parts of said amine fraction to 100 parts of said glycidyl polyether by weight, said amine fraction being obtained by reacting monoethanolamine with ammonia the mols of said ammonia being in excess of the mols of said material selected from the group consisting of monoethanolamine and ethylene glycol up to a mol ratio of about 3:1, at a temperature from about 150° C. to 400° C. and a superatmospheric pressure in the presence of hydrogen and a hydrogenation catalyst selected from the group consisting of the metals and oxides of copper, nickel and cobalt and chromium oxide thereby producing a complex reaction product, subjecting said reaction product to distillation at a temperature up to about 200° C. at atmospheric pressure to remove lower-boiling components thereby leaving a high-boiling amine product, and subjecting said high boiling amine product to distillation at a temperature up to about 135° C. at 10 mm. of pressure absolute to recover overhead an amine fraction having a Gardner color less than 10.

6. An infusible resinous composition produced by admixing a glycidyl polyether represented by the formula:

in which $n$ is an integer of the series 0, 1, 2, 3 . . . and R represents a divalent hydrocarbon radical derived from a polyhydric compound selected from the group consisting of polyhydric phenols and polyhydric alcohols by the removal of the hydroxyl groups, with a mixed higher amine fraction in the proportion of 5–30 parts of said amine fraction to 100 parts of said glycidyl polyether by weight, said mixed higher amine fraction obtained by a method from the group consisting of (a) reacting a material selected from the group consisting of monoethanolamine and ethylene glycol with ammonia the mols of said ammonia being in excess of the mols of said material selected from the group consisting of monoethanolamine and ethylene glycol up to a mol ratio of about 3:1, at a temperature from about 150° C. to 400° C. and a superatmospheric pressure in the presence of hydrogen and a hydrogenation catalyst thereby producing a complex reaction product and subjecting said reaction product to distillation at a temperature up to about 200° C. at atmospheric pressure to remove lower-boiling components thereby leaving a high-boiling amine product and (b) subjecting the product obtained by (a) to distillation to obtain, as a mixed amine fraction, a 50–90% overhead distillate of said high-boiling amine product (a).

7. A process according to claim 6 in which said mixed higher amine fraction is a 60% overhead distillate of said high-boiling amine product (a).

8. A process according to claim 6 in which said mixed higher amine fraction is an 80% overhead distillate of said high-boiling amine product (a).

References Cited in the file of this patent

UNITED STATES PATENTS

| | | |
|---|---|---|
| 2,412,209 | Dickey et al. | Apr. 22, 1943 |
| 2,585,115 | Greenlee | Feb. 12, 1952 |